(12) United States Patent
Tracadas et al.

(10) Patent No.: US 10,901,104 B2
(45) Date of Patent: Jan. 26, 2021

(54) ENCODED DRIVING PULSES FOR A RANGE FINDER

(71) Applicant: Halliburton Energy Services, Inc., Houston, TX (US)

(72) Inventors: Philip W. Tracadas, West University, TX (US); Paul Cooper, Humble, TX (US); Mark Collins, Houston, TX (US); George Stevenson, Humble, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/037,576

(22) PCT Filed: Dec. 31, 2013

(86) PCT No.: PCT/US2013/078461
§ 371 (c)(1),
(2) Date: May 18, 2016

(87) PCT Pub. No.: WO2015/102611
PCT Pub. Date: Jul. 9, 2015

(65) Prior Publication Data
US 2016/0291187 A1  Oct. 6, 2016

(51) Int. Cl.
*G01V 1/44* (2006.01)
*G01V 1/40* (2006.01)
*E21B 49/00* (2006.01)
*E21B 47/107* (2012.01)

(52) U.S. Cl.
CPC ............... *G01V 1/44* (2013.01); *E21B 49/00* (2013.01); *G01V 1/40* (2013.01); *E21B 47/107* (2020.05)

(58) Field of Classification Search
CPC .. G01V 1/40; G01V 1/44; E21B 49/00; E21B 47/101; E21B 47/107
USPC ............................ 367/25; 181/102, 103, 106
See application file for complete search history.

(56) References Cited

U.S. PATENT DOCUMENTS

| 4,969,129 A | * | 11/1990 | Currie ................ G01V 1/005 181/113 |
| 5,226,018 A | * | 7/1993 | Chang ................ G01V 1/005 367/39 |
| 5,422,860 A | | 6/1995 | Bradley et al. |

(Continued)

FOREIGN PATENT DOCUMENTS

| WO | 199304383 | 3/1993 |
| WO | 2012085339 A1 | 6/2012 |
| WO | 2013066821 A2 | 5/2013 |

OTHER PUBLICATIONS

International Search Report dated Sep. 25, 2014, issued in corresponding application No. PCT/US2013/078461, 2 pgs.

*Primary Examiner* — Ian J Lobo
(74) *Attorney, Agent, or Firm* — Chamberlain Hrdlicka (57) ABSTRACT

An acoustic tool, system, and method for performing downhole measurements. An encoded pulse sequence is transmitted from an acoustic tool. First reflections are received from the encoded pulse sequences. The first reflections from the encoded pulse sequence are identified from a number of reflections of the encoded pulse sequence. Measurements are performed utilizing the first reflections of the encoded pulse sequence. Other systems and methods are presented.

18 Claims, 8 Drawing Sheets

(56) References Cited

U.S. PATENT DOCUMENTS

| | | | | |
|---|---|---|---|---|
| 5,768,939 A | * | 6/1998 | Quayle | G01F 23/2962 |
| | | | | 73/290 V |
| 5,874,676 A | | 2/1999 | Maki, Jr. | |
| 5,995,447 A | | 11/1999 | Mandal et al. | |
| 6,023,445 A | | 2/2000 | Cook et al. | |
| 6,176,323 B1 | | 1/2001 | Weirich et al. | |
| 6,651,739 B2 | | 11/2003 | Arndt et al. | |
| 8,462,834 B2 | * | 6/2013 | Deliwala | G01S 7/35 |
| | | | | 375/219 |
| 2006/0067162 A1 | * | 3/2006 | Blankinship | E21B 47/0005 |
| | | | | 367/35 |

* cited by examiner

ENCODED DRIVING PULSES FOR A RANGE FINDER

BACKGROUND

Understanding the structure and properties of geological formations may reduce the cost of drilling wells for oil and gas exploration. Measurements made in a borehole (i.e., down hole measurements) are typically performed to attain this understanding, to identify the composition and distribution of material that surrounds the measurement device down hole. To obtain such measurements, logging tools of the acoustic type are often used to provide information that is directly related to geomechanical properties.

Some acoustic tools utilize transmitters to create pressure waves inside the borehole fluid, which in turn create several types of waveguide modes in the borehole. Corresponding modes of propagation occur in the formation surrounding the borehole, and each of these may be used to provide information about formation properties. Thus, data associated with the various modes may be acquired and processed to determine formation properties, such as compressional and shear wave velocity in the formation. In some cases, the acoustic tool may experience ring-down where the transducer continues to oscillate for a period of time after an original signals or pulse is fired or transmitted from the acoustic tool. If a reflected signal arrives during the ring-down it may be difficult for the acoustic tool to detect and process the reflected signal.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

The illustrative embodiments provide a system, method, and sensor tool for utilizing encoded driving pulses. In one embodiment, an ultrasonic acoustic transducer range finder is utilized to transmit and receive the encoded pulse sequences. The encoded pulse sequences may be identified utilizing a pattern associated with spacing and duration of the pulses. Other parameters of the pulse sequence may also be utilized to identify the first reflection of the encoded pulse sequence during ring-down. The encoded pulse sequences may also be referred to as codes and pulses may alternatively referred to as bits.

The illustrative embodiments allow extensive information about a well, reservoir, or other environment to be obtained. A wellbore may be measured to evaluate the applicable formations and downhole components. The illustrative embodiments are utilized to improve sensitivity and detectability of communicated pulses. The various embodiments may be particularly useful for poor or nominal quality transducers, such as those that have variable or long ring-down characteristics. Ring-down may result when the driven transducer continues to ring once the driving signal, voltage, or current has been removed or stopped. In some cases, ring-down is worse in noisy or reflective environments where signal attenuation is low. As used herein, "or" does not require mutual exclusivity.

The illustrative embodiments may be utilized to perform casing inspection (e.g., thickness and diameter), cement evaluation or imaging, borehole imaging, fracture detection, open hole volume calculations, borehole shape analysis, and so forth. The measurements and analysis may be performed in real-time, communicated, or logged for subsequent review. For example, the illustrative embodiments may be implemented as a stand-alone device, such as a wireline logging tool. The illustrative embodiments may also be integrated with existing natural resource exploration tools or integrated with a drill string, logging-while-drilling tool, bottomhole assembly, or so forth.

Figure 1:
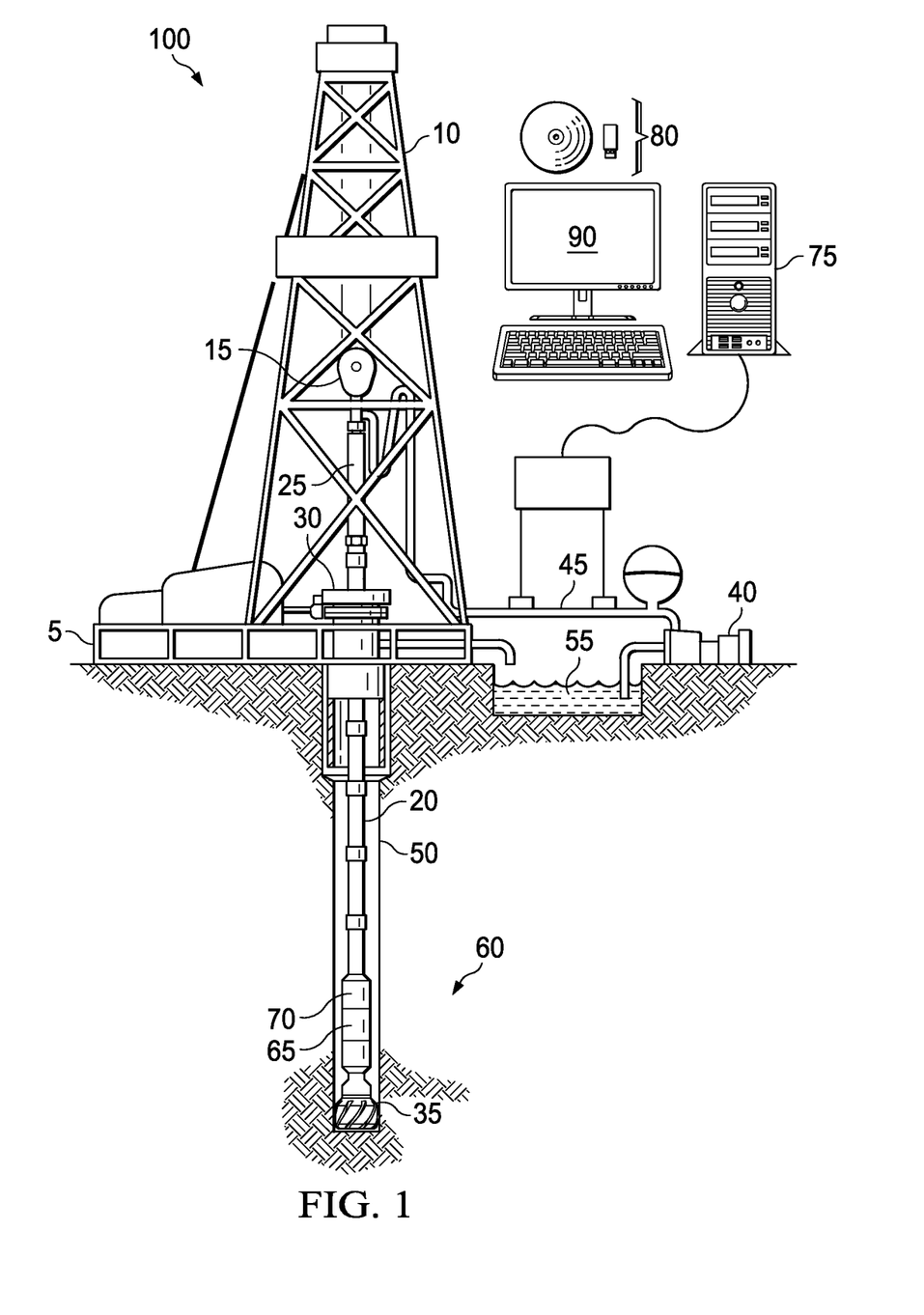
FIG. 1 is a schematic representation, with a portion shown in cross section, of a logging-while-drilling environment in accordance with an illustrative embodiment.

FIG. 1 shows an illustrative logging while drilling (LWD) environment 100. A drilling platform 5 is equipped with a derrick 10 that supports a hoist 15. The rig operator drills an oil or gas well for production or exploration using a string of drill pipes 20. The hoist 15 suspends a top drive 25 that rotates the drill string 20 as it lowers the drill string 20 through the wellhead 30. Connected to the lower end of the drill string 20 is a drill bit 35. The drill bit 35 is rotated and drilling accomplished by rotating the drill string 20, by use of a downhole motor near the drill bit 35 or the top drive 25, or by both methods.

In one embodiment, recirculation equipment 40 pumps drilling or other fluids through supply pipe 45, through top drive 25, and down through the drill string 20 at high pressures and volumes to emerge through nozzles or jets in the drill bit 35. The drilling fluid then travels back up the hole via the annulus formed between the exterior of the drill string 20 and the borehole wall 50, through blowout preventers, and into a retention pit 55, reservoir, or enclosed receptacle on the surface. On the surface, the drilling fluid may be cleaned and then recirculated by the recirculation equipment 40. The drilling fluid may be utilized to carry cuttings from the base of the bore to the surface and balance the hydrostatic pressure in the rock formations in the LWD environment 100.

The bottomhole assembly 60 (i.e., the lowermost part of drill string 20) may include thick-walled tubulars called drill collars, which add weight, stability, and rigidity to aid the drilling process. The thick walls of these drill collars make them useful for housing instrumentation, tools, and LWD sensors. For example, the bottomhole assembly 60 of FIG. 1 may include one or more acoustic tools 65 (also referred to as a range finder) and a communications and control module 70. The various embodiments herein described may be implemented in the one or more acoustic tools 65.

In addition, the acoustic tools 64 or the bottomhole assembly 60 may further include, but is not limited to, a natural gamma ray detector, a resistivity tool, a nuclear magnetic resonance tool, a neutron porosity tool, or other exploration tools. Other sensor tools and sensing instruments may also be included in the bottomhole assembly 60, including without limitation position sensors, orientation sensors, accelerometers, compasses, pressure sensors, temperature sensors, vibration sensors, mud telemetry, and so forth. The illustrative embodiments may be integrated with, connected to, or in communication with any of the aforementioned tools or sensors.

The communications and control module 70 (telemetry module) collects data regarding the formation properties or various drilling parameters, tool configurations and readings, from the sensor tools 65 and stores the data in an internal memory. In addition, some or all of the data may be transmitted to the surface by wireline communications, wireless communications, magnetic communications, seismic communications, or so forth.

For example, the communications and control module 70 may modulate acoustic signals to generate encoded pulses that propagate to the surface. The acoustic signals may be received, converted to an electrical signal, digitized, and processed into data by one or more computing or communications devices. Computer 75 operates in accordance with software (which may be stored on information storage media 80) and user input received via an input device to process and decode the received signals. The resulting sensory and telemetry data may be further analyzed and processed by computer 75 to generate a display of useful information on a computer monitor 90 or some other form of a display device or output. For example, a driller may employ the system of the LWD environment 100 to obtain and view ranging information for the borehole wall 50 or to downhole formations (not shown).

Figure 2:
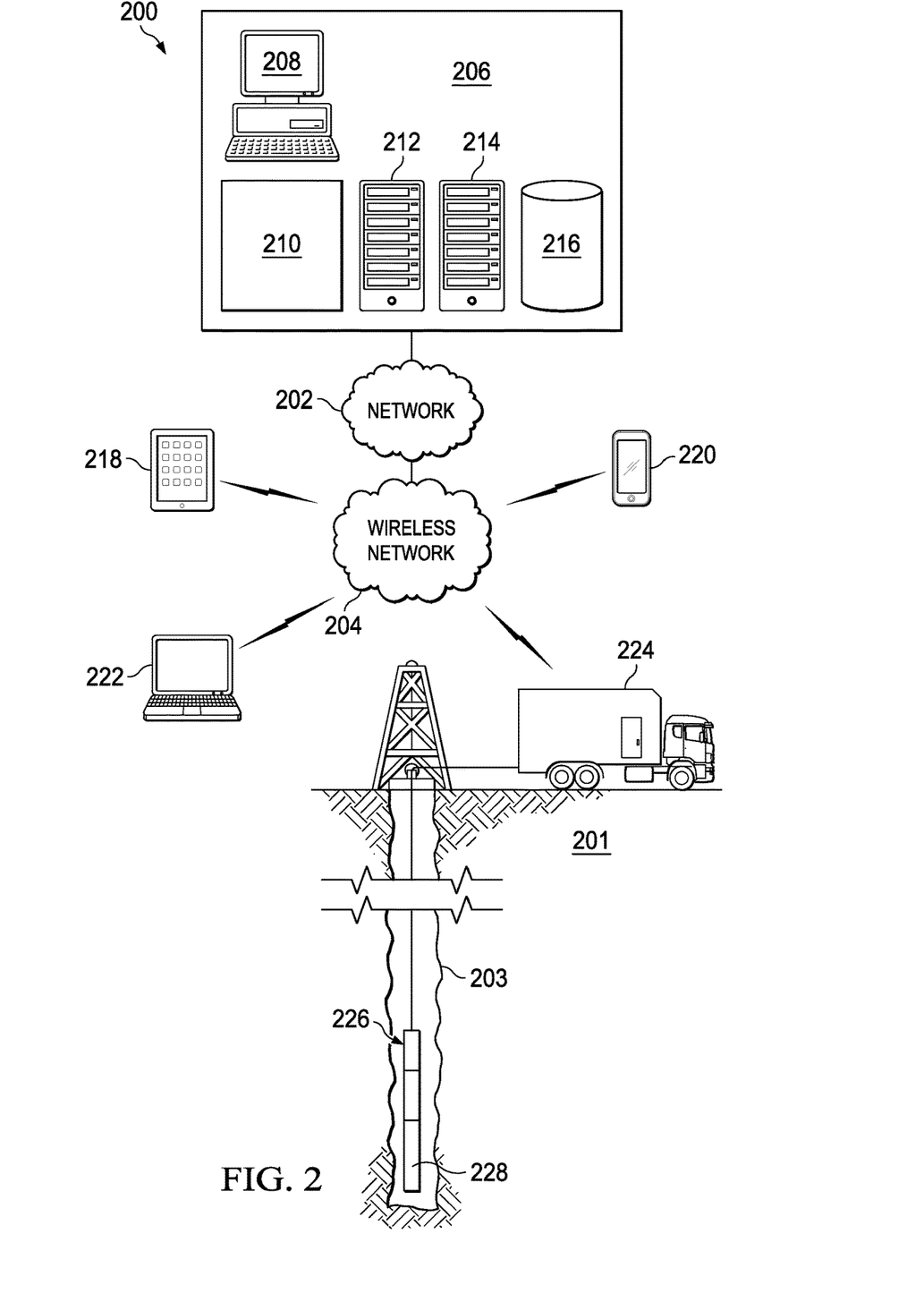
FIG. 2 is a schematic representation, with a portion shown in cross section, of a wireline logging environment in accordance with an illustrative embodiment.

FIG. 2 is a schematic, representation of a wireline logging environment 200 in accordance with an illustrative embodiment. The wireline logging environment 200 may include any number of tools, devices, locations, systems, and equipment that may be integrated with the sensor tools, systems, and methods herein described. The wireline logging environment 200 includes a reservoir 201.

The reservoir 201 is a designated area, location, or three-dimensional space that may include natural resources, such as crude oil, natural gas, or other hydrocarbons. The reservoir 201 may include any number of formations, surface conditions, environments, structures, or compositions. The illustrative embodiments may utilize sensors to determine properties and measurements of the reservoir 201 and a wellbore 203 penetrating the reservoir. For example, encoded acoustic signals may be transmitted and the reflected signals may be utilized to measure parameters, properties, structures or formations, deposits, downhole tools or components, or other properties of the reservoir 201, wellbore 203, or fluid within the wellbore 203. For example, a distance between the wellbore walls and the tool or transducer may be determined utilizing the first reflected signals. Processing or computations utilizing the reflected signals may be performed downhole, on-site, off-site, at a movable location, at a headquarters, utilizing fixed computational devices, or utilizing wireless devices.

The data and information determined from acoustic examination of the wellbore 203 may be utilized to perform measurements, analysis, or actions for exploration or production of the reservoir 201. The wellbore 203 may be drilled and configured with the reservoir 201 to extract wellbore fluids or gases from the formation. The size, shape, direction, and depth of the wellbore 203 may vary based on the conditions and estimated natural resources available. The wellbore 203 may include any number of support structures or materials, divergent paths, surface equipment, or so forth.

In one embodiment, the processes herein described may be performed utilizing specialized sensor tools, including sensors, logic, interconnects, power sources, and other similar electrical components. The logic utilized by the tool 228 may include processors, memories, field programmable gate arrays (FPGAs), batteries, wires, leads, pins, connectors, amplifiers, application-specific integrated circuits (ASICs), computer instructions, code, programs, or applications, or any combination of software, hardware, and firmware.

In one embodiment, the wireline logging environment 200 may include one or more of the following: a network 202, a wireless network 204, a facility 206, a computer 208, a management system 210, servers 212 and 214, a database 216, a tablet 218, a wireless device 220, a laptop 222, and a mobile computing system 224. The mobile computing system 224 may include downhole equipment 226 and tool 228.

The network 202 may be any type of computing or communications network including one or more of the following networks: a wide area network, a local area network, one or more private networks, the Internet or public networks, a telephone network (e.g., publicly switched telephone network), a cable network, a satellite network, one or more cellular networks, cloud networks, virtual networks, and other wireless and data networks.

The wireless network 204 is one example of a wireless network for regional or local communications (e.g., WiFi, 4G, LTE, PCS, Bluetooth, Zigbee, WiMAX, GPRS, etc.). The network 202 and the wireless network 204 may include any number of network nodes, devices, systems, equipment, and components (not depicted), such as routers, servers, network access points/gateways, cards, lines, wires, switches, DNS servers, proxy servers, web servers, and other network nodes and devices for assisting in routing and computation of data/communications as herein described.

In one embodiment, integrated or external tools or components communicating with the mobile computing system 224 may be configured to penetrate an earth formation through the wellbore 203 to stimulate, energize, and measure parameters of a formation. One or more sensors or logging tools (e.g., probes, drill string measurement devices, nuclear magnetic resonance imagers, etc.) may be integrated with or connected to the downhole equipment 226 and tool 228 communicating with the mobile computing system 224 to perform signal generation, measurements, logging, data retrieval, data storage, processing, and information display.

For example, the mobile computing system 224 may determine any number of static and dynamic properties of the reservoir 201. The static and dynamic properties may include measurements of or changes in pressure, wellbore distances and diameters, ranges, depth, time delays for transmission and reflection, temperature, composition (e.g., hydrocarbon composition levels, measurements, and statistics), fluid flow rate, fluid composition, density, porosity, thresholds, position and displacement, depth, and so forth. Changes or variations in how the formations within the reservoir 201 or wellbore 203 reflect acoustic signals may be utilized to make any number of determinations regarding the natural formations, structures, or man-made components within the reservoir 201.

For example, at various times during the drilling process, a drill string 20 (see FIG. 1) may be removed from the borehole 203. Once the drill string has been removed, logging operations may be conducted using the tool 228 (e.g., acoustic logging tool) which may be a wireline or wireless tool. For example, the tool 228 may be a sensing instrument suspended by a cable having conductors for transporting power to the tool and telemetry from the tool to the surface. The tool 228 may be preconfigured for testing or configured in real-time for the conditions of the wireline logging environment 200.

In addition to wireline or slickline tools 228. The tool 228 may alternatively represent any number of measurement-while-drilling (MWD), seismic-while-drilling (SWD), or other downhole or reservoir tools. In one embodiment, the tool 228 may rotate one or more sensors to enhance measurements made by the tool 228. The tool 228 may store or communicate the reflected signals as measured to determine properties in each section of the reservoir 201 or the wellbore 203. The tool 228 may be self-contained and powered or connected to one or more fixed or mobile stations, systems, devices, equipment, or vehicles at the surface. The tool 228 may dynamically change the encoded signal transmitted in real-time based on the downhole conditions to best determine the applicable parameters. For example, the tool 228 may adjust the pulse sequence, such as the number of bits encoded and sent, the pulse properties (e.g. duration, amplitude, rise times, etc.), and so forth.

In one embodiment, the tool 228 or other portions of the mobile computing system 224 may communicate one or more signals communicated from the tool 228. The pulses, waves, or signal utilized by the tool 228 to perform measurements may be generated by the tool 228 or received from any number of sources. The computer 208, tablet 218, wireless device 220, laptop 222, and mobile computing system 224 may execute a local program or app to configure the tool 228 and retrieve and utilize the measurements acquired in the process herein described. For example, the wireless device 220 may be configured to increase or decrease the amplitude, pulse spacing, duration, and number of the pulses utilized by the tool 228. The wireless device 220 may also be utilized to dynamically adjust the encoded sequences, filter particular types of signals, turn the tool (in any of three dimensions), or so forth.

In another embodiment, the tool computations and analysis may be performed by the management system 210, servers 212 and 214, or other network devices. For example, the user may submit information and parameters utilizing the wireless device 220 to perform the calculations on the server 212 with the results being stored in the database 216 for subsequent access. The database 216 may store the sensor orientation information, measurements, static properties, dynamic properties, flow simulation results (e.g., initial values, partial output, and completed output), parameters, configuration, settings, and so forth. The database 216 may be accessed by any number of users and devices in the wireline logging environment 200 to retrieve and update the data.

In one embodiment, the servers 212 and 214 may execute an application that is available to any of the devices of the wireline logging environment 200 through the network 202 and the wireless network 204. For example, the application may display a user interface for receiving parameters, properties, and other information for configuring the tool 228 or reviewing the measurements of the tool 228. In one embodiment, the server 214 is a web server that hosts the application for downhole measurement processing that is accessible through one or more browsers utilized by any of the computer 208, tablet 218, wireless device 220, laptop 222, and mobile computing system 224.

Figure 3:
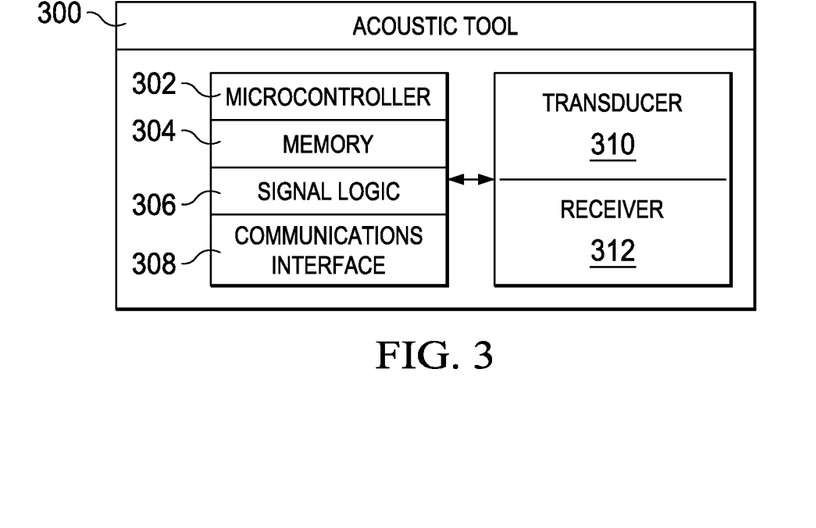
FIG. 3 is a block diagram of an acoustic tool in accordance with an illustrative embodiment.

FIG. 3 is a block diagram of an acoustic tool 300 in accordance with an illustrative embodiment. The acoustic tool 300 may include any number of components that are not specifically described including, but not limited to, batteries, fuel cells, power sources, positioning circuits and components, phase linear array transducers, polesitter receivers, pulse delay circuitry, echo controllers, multiplexers, summing circuits, logarithmic amplifiers, echo delay circuits, digital to analog converters, analog-to-digital converters, communications interfaces, processors, boards, antennas, and so forth. In one embodiment, the acoustic tool 300 may include a microcontroller 302, a memory 304, signal logic 306, communications interface 308, transducer 310, and receiver 312. The various components of the acoustic tool 300 may be connected or communicate by pins, wires, traces, leads, fiber optics, or other communications or conductive components. In another embodiment, all or a portion of the acoustic tool may be integrated in a single circuit or ASIC.

The transducer 310 generates a pulse sequence including multiple signals or pulses as an acoustic source. For example, the pulse sequence may include three pulses. The transducer 310 may be a single acoustic generator or an array of acoustic generators. The transducer 310 may be configured to generate various forms of encoded pulse sequences as waves that propagate through an earth formation. In one embodiment, driving the transducer 310 asymmetrically means that a encoded signal, waveform, sequence, or pulse train does not look the same in the time-amplitude space when the time axis is reversed.

In one embodiment, the spacing of the pulses in the pulse sequence is not regular or identical. The asymmetry of the signals transmitted by the transducer 310 may be accomplished in a number of ways. In one embodiment, a random time period between pulses of a pulse train may be varied. In another embodiment, selected time periods may be utilized between the different pulses. In addition, any number of other asymmetric pulse encoding and decoding schemes may be utilized. The transducer 310 may transmit waves directionally or omnidirectional about the periphery of the acoustic tool (e.g., utilizing one or more antennas or transmitting components). Spacing of the pulses in the pulse sequence may be determined by the expected standoff to prevent reflections from returning while the pulse sequence is being fired or driven by the transducer 310. In one embodiment, the amplitude of the pulse sequence may be selected based on the properties of the mud and how the mud attenuates the pulse sequence. Specific parameters of the pulse sequence may be optimized based on the expected ring-down of the transducer 310.

In one embodiment, the transducer 310 may be an acoustic source made up of piezoelectric components, Bender bars, or other transducer components suitable for generating acoustic pulse sequences in downhole conditions. The operating frequency of the transducer 310 may be selected on the basis of a trade-off between attenuation and wavelength in which the wavelength is minimized subject to requirements for limited attenuation. Subject to the attenuation limits on performance, smaller wavelength may offer improved spatial resolution of the acoustic tool 300. In one embodiment, the transducer 310 may include a capacitor or array of capacitors that may be charged and then discharged to create the unique and encoded pulse sequences.

The amplitude and time between each pulse (spacing) in a sequence may be varied based on applicable conditions and a desired configuration and reflection. The pulses transmitted by the transducer 310 may represent sine, square, triangle, sawtooth, or combination of different wave forms. In one embodiment, the frequency of the pulse sequence may be between 250 kHz and 800 kHz. However, any number of frequencies suitable for downhole transmission and reflection may be utilized.

The parameters of each pulse and encoded sequence including rise time, duration, amplitude, separate time, decay, and so forth may be set by the user or automatically by the system based on the encountered conditions. For example, the amplitude of the pulses may be automatically increased in sandy environments. In one embodiment, the amplitude of the encoded pulse sequence may be increased in environments with high mud weights and high cutting contents.

The reflections of the encoded waves are received by the receiver 312. The receiver 312 may utilize the template or pattern of the original encoded pulse to match filter the return signals or echoes. In addition, deconvolution may also be utilized to identify, analyze and process the reflected signals. The encoded pulses may be particularly useful in environments with extensive noise or interference due to the driving pulse itself. The receiver 312 and corresponding microcontroller 302 and signal logic 306 may more effectively distinguish the original reflected signal from the interference and eliminate or minimize ring-down. In certain environments, without the various embodiments the detected ring-down peaks may override the echo peaks resulting in indistinguishable, incorrect, or inaccurate information.

Asymmetric encoded pulses may be particularly useful for close ranging and high mud weights within a wellbore. In one embodiment, the transducer 310 and the receiver 312 may be integrated as a single transceiver. However, in other embodiments, the transducer 310 and the receiver 312 may represent an array of receivers or components for generating/transmitting and receiving waves, respectively. In one embodiment, the transducer 310 and the receiver 312 may include multiple components that are spaced about the body of the acoustic tool 300. For example, the various portions of the acoustic tool 300 may be broken up into various sectors or sections. Each of the sectors may be calibrated differently as a function of temperature, pressure, and environmental factors specific to the sector.

In on embodiment, the receiver 312 may include a piezoelectric component that converts acoustic waves received into an electric signal that may be amplified and converted to a digital signal for processing by the microcontroller 302. The microcontroller 302 is a small computing component on a single integrated circuit including, for example, a processor, core, memory, and programmable input/outputs. In one embodiment, the microcontroller 302 may be an ASIC or field programmable gate array (FPGA). The microcontroller 302 may include logic or instructions configured to implement the processes and functionality herein described. In one embodiment, the microcontroller 302 may execute instructions to send commands to the components of the acoustic tool 300.

The processor (not shown) of the microcontroller 302 is circuitry or logic enabled to control execution of a set of instructions. The processor may be one or more microprocessors, digital signal processors, ASIC, central processing units, or other devices suitable for controlling an electronic device including one or more hardware and software elements, executing software, instructions, programs, and applications, converting and processing signals and information, and performing other related tasks. The processor may be a single chip or integrated with other computing or communications elements.

The memory 304 is a hardware element, device, or recording media configured to store data for subsequent retrieval or access at a later time. The memory 304 may be static or dynamic memory. The memory 304 may include a hard disk, random access memory, cache, removable media drive, mass storage, or configuration suitable as storage for data, instructions, and information. In one embodiment, the memory 304 and processor may be integrated. The memory may use any type of volatile or non-volatile storage techniques and mediums.

When the acoustic tool 300 is enabled, the microcontroller 302 may control the triggering and timing of the transducer 310, and record and process the signals from the receiver 312. The microcontroller 302 may command the transducer 310 to periodically generate encoded waves. In another embodiment, the microcontroller 302 may have the transducer continuously transmit a pre-selected pulse sequence. The acoustic pressure waves may propagate through the fluid and materials in a borehole and into the surrounding formation. The reflections from the original encoded waves are reflected back to the receiver 312. The first reflected signals may be filtered from subsequent reflections utilizing any number of pattern recognition systems or algorithms. The received signals may be processed by the microcontroller 302 to determine formation anisotropy, shear velocity, proximities, impedance, and other information. For example, the encoded signals may be communicated to determine a diameter or range to the wellbore wall. The range may include a distance to a designated boundary or object, such as the wellbore wall, as well as a time delay associated with the first reflection.

In another embodiment, the signal logic 306 may be configured to send the commands that are utilized by the transducer 302 to transmit the encoded waves. The signal logic 306 may include specific wave patterns that are used based on detected conditions. For example, the amplitude and waves separation may be increased or decreased based on the types of fluids, earth formations, and so forth that surround the acoustic tool 300. The signal logic 306 may utilize one or more programs, instructions, digital logic, analog logic, firmware, or combination thereof. In one embodiment, the signal logic 306 may be integrated with the microcontroller 302.

The communications interface 308 may include a wireline or wireless communications interface. For example, the communications interface 308 may communicate received raw or processed data to surface devices, systems, or equipment. The communications interface 308 may also be configured to communicate telemetry data for controlling the acoustic tool 300. In one embodiment, the acoustic tool 300 may be an ultrasonic scanner and may be utilized in conjunction with other devices, such as an in-line centralize or a mud velocity sensor.

Figure 4A:
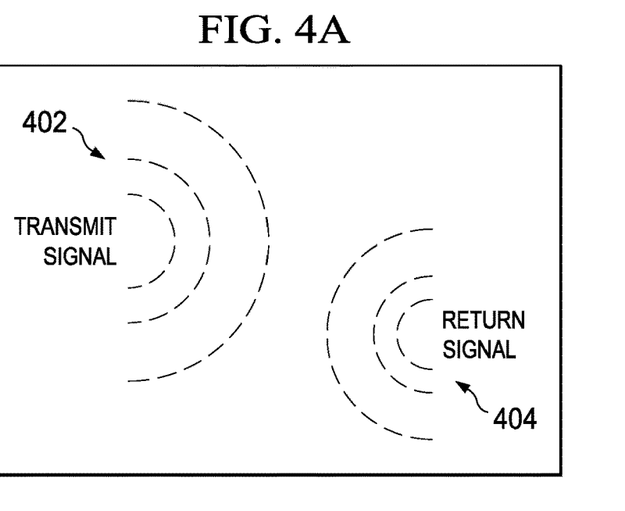
FIG. 4A is a graphical representation of an encoded pulse sequence being transmitted and reflected in accordance with an illustrative embodiment.
Figure 4B:
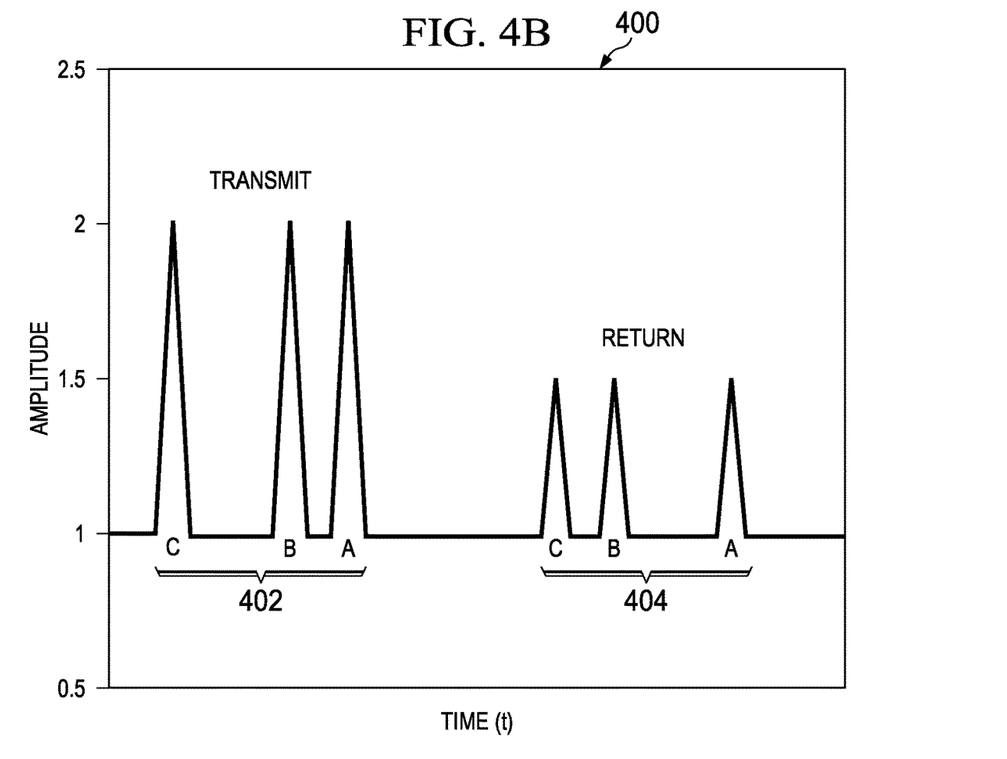
FIG. 4B is a graph illustrating the encoded pulse sequence of FIG. 4A being transmitted and reflected in accordance with an illustrative embodiment.

Turning now to FIGS. 4A-B, an encoded pulse sequence being transmitted and reflected in accordance with an illustrative embodiment is presented. The encoded pulse sequence is shown as a transmitted signal 402 and as a reflected signal 404. The transmitted signal 402 and the reflected signal 404 may be transmitted and received through any number of formations, structures, liquids, gases, solids, components, or mixtures As shown, the transmitted signal 402 is not a symmetrical pulse or waveform. As a result, the reflected signal 404 is not symmetrical either. In one embodiment, the encoded signal is more easily identified by comparing the original pattern (e.g., separation of pulses) of the transmitted signal 402 to the reflected pattern from the reflected signal 404.

In the illustrative embodiments, instead of using multiple synchronous drive pulses to drive a crystal transducer at its resonance frequency, multiple encoded pulses may be utilized. Using multiple synchronous drive pulses may result in returned or echoed signals that may be not be distinguished from the ring down of the original signals. As shown in FIG. 4, a pitch-catch acoustic transducer may be driven with an asymmetric (in time) encoded pulse sequence represented by the transmitted signal 402. Match filtering or other means of recognition may be utilized to identify the first instance of a reflected signal 404.

Figure 5:
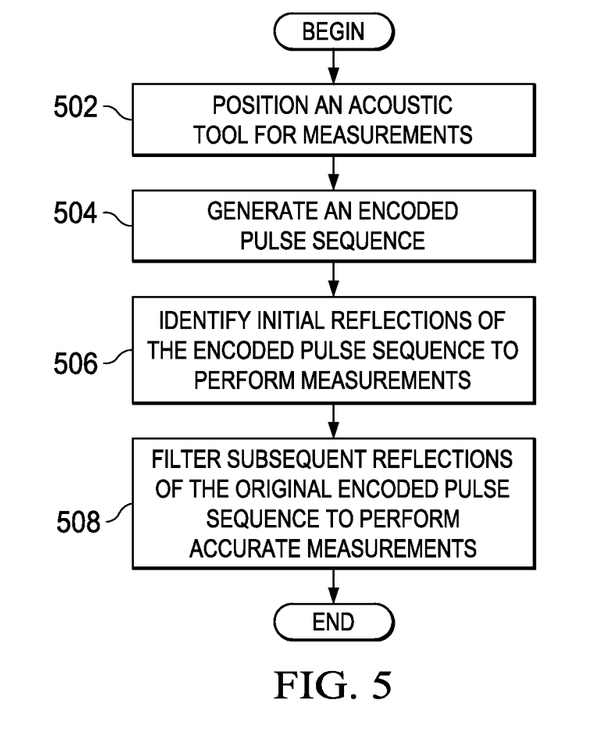
FIG. 5 is a flowchart of a process for performing measurements utilizing an encoded pulse sequence in accordance with an illustrative embodiment.

FIG. 5 is a flowchart of a process for performing measurements utilizing an encoded pulse sequence in accordance with an illustrative embodiment. The process of FIG. 5 may be implemented by an acoustic tool, device, or system as is herein described.

The process may begin with the system positioning an acoustic tool for measurements (step 502). The measurements may include performing ranging measurements to a wellbore or formations within a reservoir. The acoustic tool may be positioned downhole within the wellbore or in another environment.

Next, the system generates an encoded pulse sequence (step 504). The encoded pulse sequence is a wave form that may be created for the applicable environment. In one embodiment, the encoded pulse sequence may be created by discharging one or more capacitors as part of a transducer to create a pulse sequence. The encoded pulse sequence may also be dynamically configured in response to the first reflected signal being undistinguishable or difficult to recognize. For example, the amplitude and spacing of each of the pulses may be varied as needed.

Next, the system identifies initial reflections of the encoded pulse sequence to perform measurements (step 506). The reflections may be identified utilizing a template, pattern, encoding, or algorithm associated with the original encoded pulse sequence that is transmitted. The first reflection may be identified from other reflections utilizing any number of characteristics, such as amplitude and the pulse pattern utilized in the encoded pulse sequence. For example, the expected amplitude of the return signal and the spacing may be utilized to best identify the reflected encoded pulse sequence as measured by a receiver and then processed by a microcontroller or signal logic.

Next, the system filters subsequent reflections of the original encoded pulse sequence to perform accurate measurements (step 508). The system filters the initial reflections utilizing the original pattern used in the original encoded pulse sequence. The filtering may be utilized to distinguish the first reflection from additional reflections and from the ring-down of the transducer. Step 508 may include performing decoding of the reflections utilizing any number of algorithms or logic utilized by the sensor tool.

Figure 6:
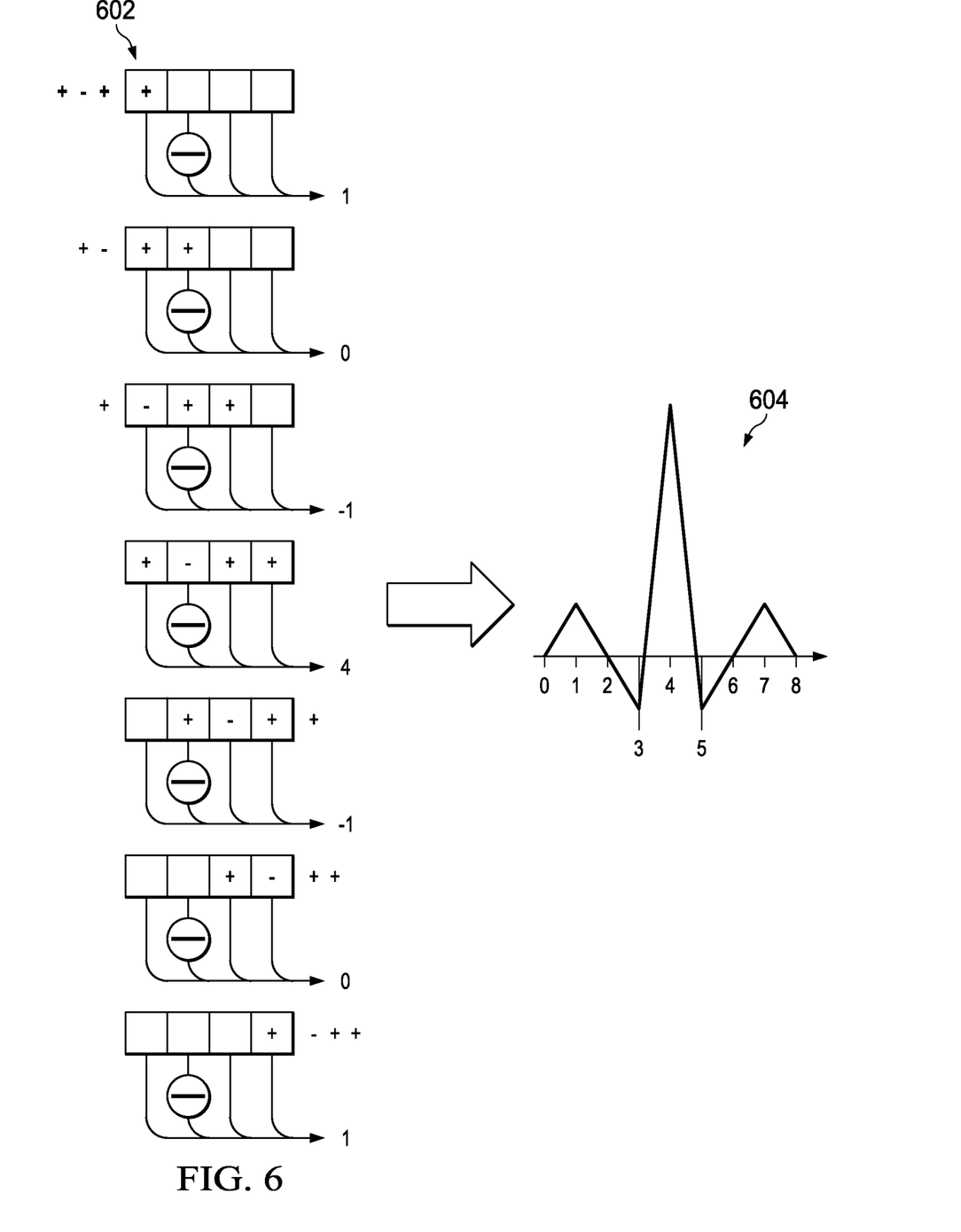
FIG. 6 is a graphical representation of a Barker code in accordance with an illustrative embodiment.

Any number of methodologies or techniques may be utilized for encoding pulses to improve range resolution and the signal-to-noise ratio (SNR). For example, the illustrative embodiments may emulate airborne radar by utilizing binary Barker codes, complementary Baker codes, poly-phase codes, or frequency modulation. Turning now to FIG. 6, a graphical representation of a Barker code 602 that may be utilized with the illustrative embodiments is presented. In one embodiment, a four tap Barker code 602 may be utilized. For example, the Barker code 602 may be convolved with the received Barker encoded waveform. The convolution is shown pictorially. The output (compressed pulse 604) of the convolution of the Barker encoded waveform with the associated Barker code is a compressed pulse 604 resulting in an improved resolution and signal-to-noise ratio relative to the original received pulse.

Figure 7:
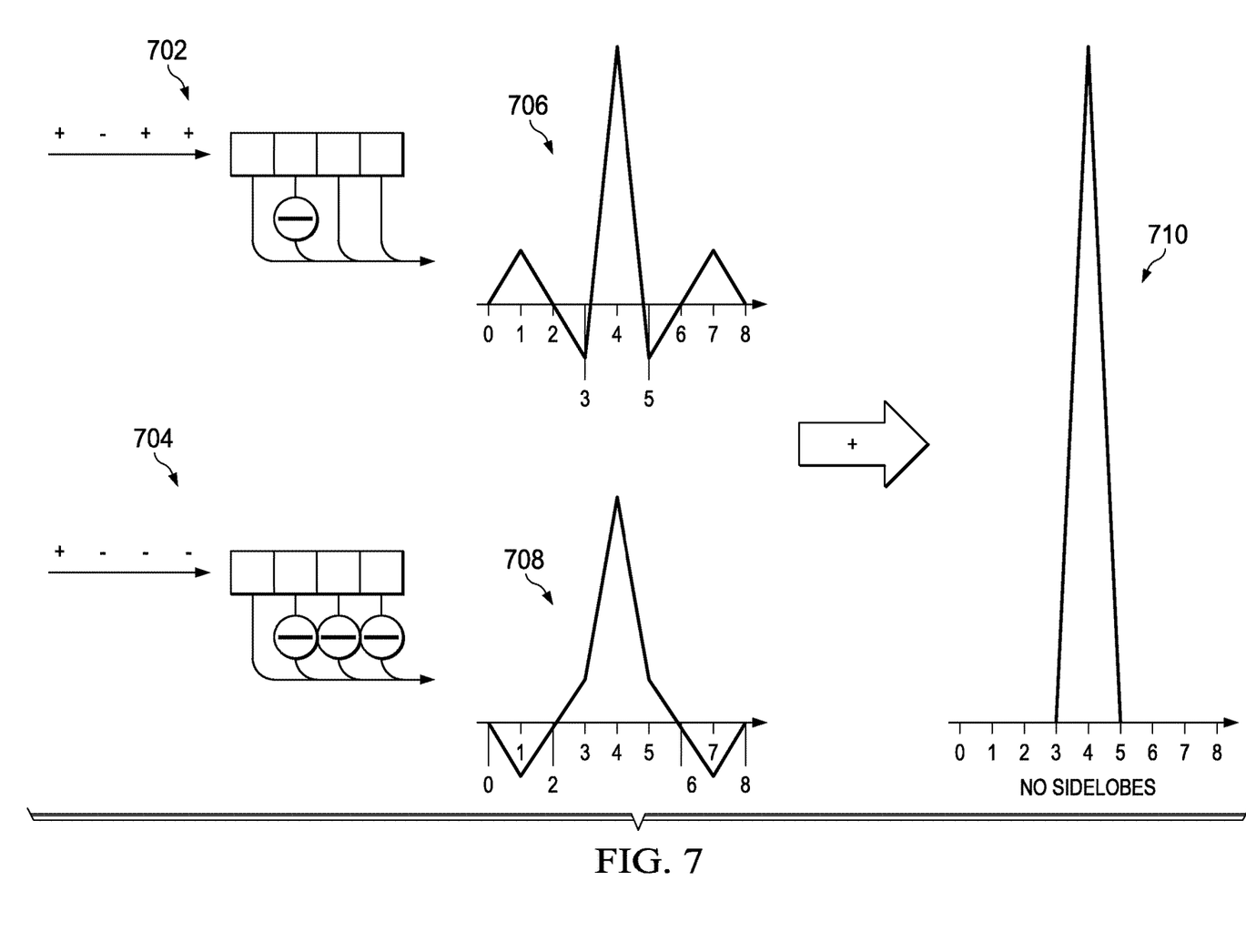
FIG. 7 is a graphical representation of another Barker code in accordance with an illustrative embodiment.

FIG. 7 shows another Barker code that may be utilized to generate pulses in accordance with an illustrative embodiment. In one embodiment, the described systems may utilize a complementary phase Barker binary code. Consecutive complementary Barker encoded received waveforms 702 and 704 may be convolved with their respective Barker codes resulting in two compressed waveforms 706 and 708. The waveforms 706 and 708 may be added to form the waveform 710. By adding the waveforms 706 and 708 corresponding to the Barker codes 702 and 704, the side lobes of the compressed waveforms 706 and 708 are cancelled. This improves the accuracy of the measurement of the time delay of the received waveform 710.

Figure 8:
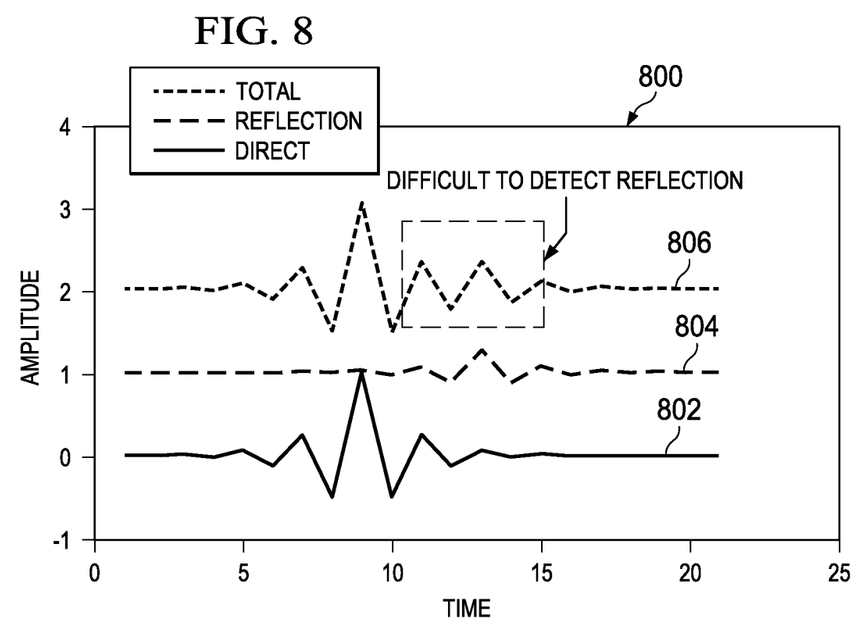
FIG. 8 is a graphical representation of an un-encoded pulse and a reflection in accordance with an illustrative embodiment.

FIG. 8 is a graphical representation of an un-encoded pulse and a reflection. The graph 800 shows a direct pulse 802, a reflected pulse 804, and the summed total 806 of the direct pulse 802 and the reflected pulse 804. As shown, the reflected pulse 804 may be difficult to detect in the summed total 806. FIG. 8 illustrates the advantages of utilizing encoded pulses to avoid ringdown and reflection issues that may potentially complicate signal transmission, reflection, and detection.

Figure 9:
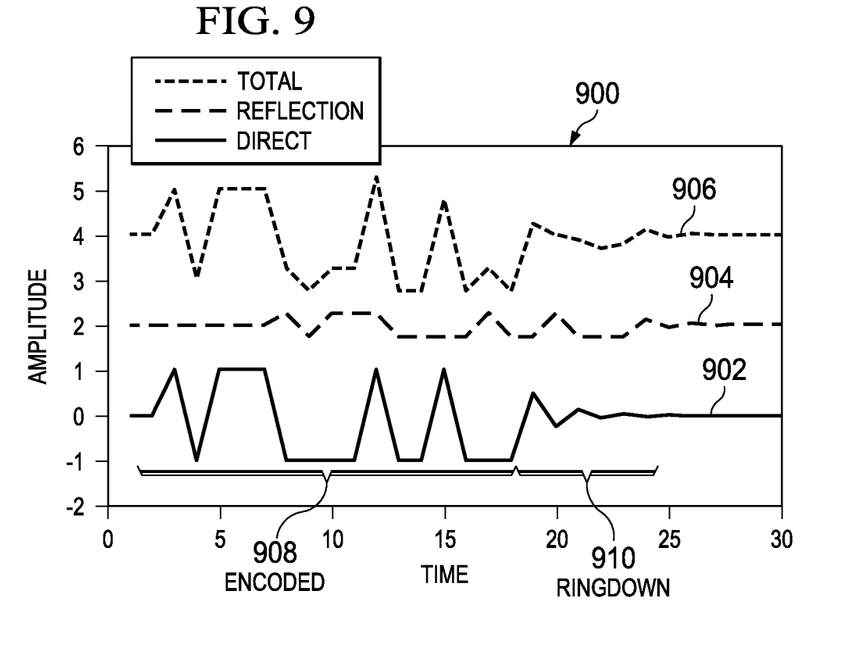
FIG. 9 is a graphical representation of a Barker encoded pulse embedded in a direct wave in accordance with an illustrative embodiment.

FIG. 9 shows a graphical representation of a Barker encoded pulse embedded in a direct wave in accordance with an illustrative embodiment. Graph 900 shows a Barker complementary phase pulse compression applied to a waveform. The graph 900 shows a direct pulse 902, a reflected pulse 904, and the summed total 906. The direct pulse 902 may be communicated by a sensor tool, the reflected pulse 904 may be received by the sensor tool and the summed total 906 may represent the waveforms in applicable environment. As shown the direct pulse 902 may include the encoded period 908 and the ringdown period 910. The direct pulse 902 and the reflected pulse 904 may be separated and their amplitude may be enhanced relative to the ring-down period 910 resulting in improved reflection detection and delay measurements. The examples shown may use short Barker codes for purposes of illustration. In practice longer Barker codes may be used to improve SNR. The length of the codes utilized may be increased by concatenating complementary codes or using poly-phase coding.

Figure 10:
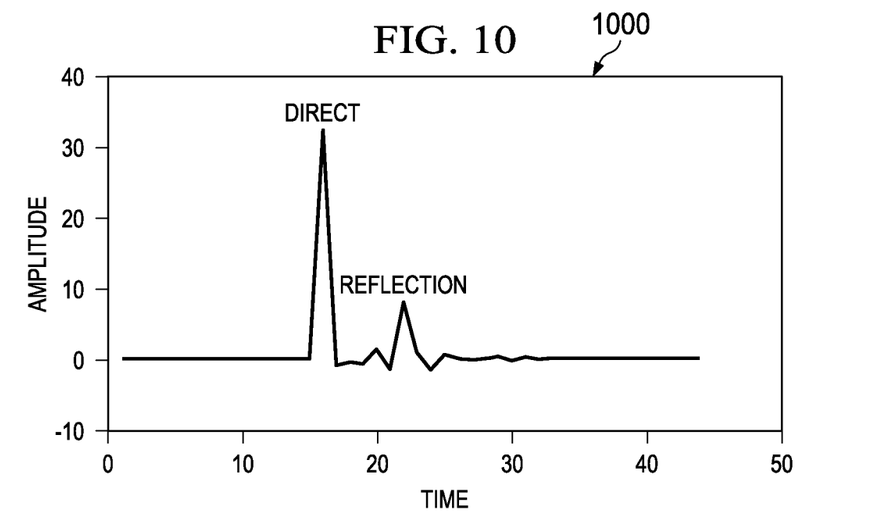
FIG. 10 is a graphical representation of a frequency modulated pulse in accordance with an illustrative embodiment.

In other embodiments, the system may utilize pulse compression and ranging using frequency modulation for pulse encoding. For example, FIG. 10 illustrates utilization of chirp frequency modulation. FIG. 10 shows a graphical representation of a frequency modulated pulse 1000 in accordance with an illustrative embodiment. The frequency of a chirped waveform varies linearly over time. Mixing a received signal with the reference chirp signal converts the direct and reflected waves into de-chirped monotone waveforms whose frequency is proportional to the delay. If the ring-down is originally monotone or nearly monotone, it becomes spread out over frequency after mixing. For example, mixing may be done before analog-to-digital conversion in hardware or after an analog to digital conversion in software. The pulses may be compressed and the delay detected by Fourier transforming the signal after mixing. The power of the reflection is enhanced relative to the ringdown by the Fourier transform to best detect the reflection. The illustrative embodiments may apply any number of different types of frequency modulation to the various sequences and pulses or analogously codes and bits.

In one embodiment, it is possible to measure the slowness of the direct wave and reflection across a receiver array. For example, five receivers may be distributed through a sensor tool to make measurements. The recorded waveforms in each receiver are compressed using the code. Then the move out of the arrival times of the direct wave and reflection in each receiver may be utilized to determine their slowness. The time delay may indicate a configuration of a reflecting object, threshold, or other component or velocity of the pulse sequence within the borehole indicating the types of gasses, liquids, solids, and combinations thereof. For example, an increased time delay may indicate a slow formation with higher impedance, such as a high-porosity gas sands. In one embodiment, the pulse sequences transmitted as well as the corresponding parameters, amplitude, time between pulses, pulse shape, and so forth, may be configured in real-time based on the determined conditions. Fluid densities may affect the wave speed of a recorded wave train based on applicable downhole composition, such as fluid mixtures, mud weights, and so forth.

The illustrative embodiments may be utilized to perform reservoir and wellbore analysis. The measurements may be utilized to monitor a wellbore and reservoir as well as perform well management. In one embodiment, after wellbore creation, the acoustic tool is herein described may be utilized to establish baseline casing conditions for the wellbore. Subsequently, the acoustic tool may be passed through the wellbore to update the casing conditions. As a result, casing conditions, formation characteristics, and reservoir actions may be formulated, adjusted, or other ways updated during the lifecycle of the wellbore and reservoir.

The information and data measured by the acoustic tool may be utilized for any number of purposes, such as formation compaction logs, casing inspection logs, open hole logs, formation studies, wellbore modeling, and determining characteristics of the reservoir are wellbore, such as compaction, strain, permeability, and potential failure.

Images or data received may be processed in any number of ways including normalization filtering, image enhancement (e.g., background noise removal), image binarization, graphical and image transformations and analysis, and other similar techniques.

The illustrative embodiments improve the sensitivity, resolution, and detectability of return echoes for an acoustic rangefinder relative to previous systems. As a result, automated range measurement algorithms may become more reliable. In addition, by improving the sensitivity of poor or nominal quality systems, cheaper parts may be used in place of purchasing higher quality parts and systems. The illustrative embodiments provide an improved range of measurements by being able to distinguish the difference between the transmitted signal, ring-down, and the reflected signal in different configuration and reflective and noisy environments.

The illustrative embodiments provide an acoustic tool, system and method for performing downhole measurements. An encoded pulse sequence is transmitted from an acoustic tool. First reflections are received from the encoded pulse sequences. The first reflections from the encoded pulse sequence are identified from a number of reflections of the encoded pulse sequence. Measurements are performed utilizing the first reflections of the encoded pulse sequence.

In other embodiments, the acoustic tool may be positioned within a borehole of a reservoir. The acoustic tool may distinguish the encoded pulse sequence from ringdown. The encoded pulse may be generated by a piezo transducer. The pulse sequence may include at three pulses. The first reflections may be identified utilizing a pattern associated with the encoded pulse sequence. The first reflections may be analyzed to determine a range to a wellbore wall. The number of reflections of the encoded pulse sequence may be filtered to identify the first reflections. Parameters of the encoded pulse sequence may be dynamically adjusted in response to an environment associated with the acoustic tool. The parameters may include at least amplitude of pulses in the pulse sequence and spacing of the pulses. The pulse sequence may be transmitted continuously.

Another embodiment provides an acoustic system. The acoustic system includes a transducer that transmits an encoded pulse sequence. The acoustic system further includes a receiver that receives the first reflections from the encoded pulse sequence. The acoustic system may further include a microcontroller in communication with the transducer and the receiver that identifies the first reflections from the encoded pulses sequence from a number of reflections of the encoded pulses sequence and performs measurements utilizing the first reflections of the encoded pulse sequence.

In other embodiments, the distance to the wellbore wall may be determined utilizing a time between transmitting the encoded pulse sequence and receiving the first reflections back. The distance may determine propagation speed of the encoded pulse sequence in an environment. The acoustic system may be positioned within a borehole of a reservoir. The microcontroller may filter the number of reflections of the encoded pulses sequence and noise from an environment of the acoustic system. The acoustic system may be a logging while drilling tool. The encoded pulse sequence may include at least three pulses. The number of reflections may be analyzed to determine a range to a wellbore wall. The microcontroller may filter noise and the number of reflections to identify the first reflections. The first reflections may be identified utilizing a pattern associated with the encoded pulse sequence.

Yet another embodiment provides an acoustic tool. The acoustic tool may include a transducer that transmits an encoded pulse sequence. The acoustic tool may include a receiver that receives the first reflections to the encoded pulse sequence. The acoustic tool may include a microcontroller that determines the first reflections form the encoded pulses sequence from interference utilizing a pattern associated with the encoded pulse sequence and performs measurements utilizing the first reflections of the encoded pulse sequence.

In other embodiments the interference may include one or more of ring-down from the transducer, noise of an environment of the acoustic tool, and additional reflections from the encoded pulse sequence. The microcontroller may filter a number of reflections of the encoded pulse sequence and noise from an environment of the acoustic tool. The acoustic tool may be a measurement-while-drilling tool. The acoustic tool may include a memory for storing the measurements. The transducer may be an array of transducers that generate pulses of the encoded pulse sequence in response to discharging one or more capacitors.

In the previous embodiments, reference is made to the accompanying drawings that form a part hereof. These embodiments are described in sufficient detail to enable those skilled in the art to practice the invention, and it is understood that other embodiments may be utilized and that logical, structural, mechanical, electrical, and chemical changes may be made without departing from the scope of the invention. To avoid detail not necessary to enable those skilled in the art to practice the embodiments described herein, the description may omit certain information known to those skilled in the art. The detailed description is, therefore, not to be taken in a limiting sense, and the scope of the illustrative embodiments is defined only by the appended claims.

In the drawings and description that are included, the drawing figures are not necessarily to scale. Certain features of the invention may be exaggerated in scale or in somewhat schematic form and some details of conventional elements may not be shown in the interest of clarity and conciseness. The previous detailed description is of a small number of embodiments for implementing the invention and is not intended to be limiting in scope.

What is claimed:

1. A method of performing downhole measurements, the method comprising:
    transmitting an encoded pulse sequence from an acoustic tool positioned downhole within a borehole in accordance with a predetermined pattern;
    receiving, contemporaneously at the acoustic tool, plurality of reflections including first reflections of the transmitted encoded pulse sequence reflected from a borehole target and ringdown from the transmitting;
    identifying the first reflections from the plurality of reflections and ring-down by utilizing the predetermined pattern; and
    performing measurements utilizing the first reflections of the encoded pulse sequence.

2. The method according to claim 1, wherein the encoded pulse is asymmetric and generated by a piezo transducer.

3. The method according to claim 1, wherein the pulse sequence has a code length of at least three bits.

4. The method according to claim 1, wherein the first reflections are analyzed to determine a range to a wellbore wall from the acoustic tool.

5. The method according to claim 1, wherein the identifying further comprises filtering the plurality of reflections of the encoded pulse sequence.

6. The method according to claim 1, further comprising dynamically adjusting parameters of the encoded pulse sequence in response to an environment associated with the acoustic tool.

7. The method according to claim 6, wherein the parameters include duration of code bits of the encoded pulse sequence, and spacing of the code bits.

8. The method according to claim 1, wherein the pulse sequence is transmitted continuously.

9. An acoustic system for performing measurements with respect to a borehole target, comprising:
    a drilling rig; and
    a drill string comprising a drill bit and a bottom hole assembly, the bottom hole assembly comprising a telemetry module and a sensor tool, the sensor tool comprising:
        a transceiver operable to transmit an encoded pulse sequence in accordance with a predetermined pattern and contemporaneously receive a plurality of reflections including first reflections of the transmitted encoded pulse sequence that are reflected from the borehole target and ringdown from the transmission; and
        a microcontroller in communication with the transceiver, wherein the microcontroller executes instructions to:
            identify the first reflections from the plurality of reflections and ring-down by utilizing the predetermined pattern; and
            perform measurements utilizing the first reflections of the encoded pulse sequence.

10. The acoustic system according to claim 9, wherein the acoustic system is positioned within a borehole of a reservoir, and wherein the encoded pulse sequence is asymmetric.

11. The acoustic system according to claim 9, wherein the logic of the microcontroller executes the instructions to filter the plurality of reflections of the encoded pulse sequence, ring-down of the transceiver, and noise from an environment of the acoustic system.

12. The acoustic system according to claim 9, wherein the encoded pulse sequence includes at least three pulses.

13. The acoustic system according to claim 9, wherein the instructions of the microcontroller are further executed to analyze the first reflections to determine a range to a wellbore wall from the acoustic system.

14. The acoustic system according to claim 9, wherein the instructions of the microcontroller are further executed to filter noise, the plurality of reflections, and the ring-down of the transceiver to identify the first reflections, and wherein the first reflections are identified utilizing a pattern associated with the encoded pulse sequence.

15. An acoustic tool for performing measurements with respect to a target comprising:
    a transceiver operable to transmit an encoded pulse sequence in accordance with a predetermined pattern and contemporaneously receive, a plurality of reflections including first reflections of the encoded pulse sequence that are reflected from the target and ring-down from the transmission; and
    a microcontroller in communication with the transceiver, wherein the microcontroller includes logic that determines the first reflections from the plurality of reflections noise, and ring-down by utilizing the pattern, and performs measurements utilizing the first reflections of the encoded pulse sequence.

16. The acoustic tool according to claim 15, wherein the microcontroller filters the plurality of reflections of the encoded pulse sequence, noise, and ring-down from an environment of the acoustic tool, and wherein the acoustic tool is a measurement-while-drilling tool.

17. The acoustic tool according to claim 15, further comprising a memory to store the measurements for subsequent access.

18. The tool according to claim 15, comprising an array of transducers to generate pulses of the encoded pulse sequence in response to discharging one or more capacitors.

* * * * *